United States Patent [19]

Sagane

[11] 3,892,585

[45] July 1, 1975

[54] SEMI-SOLID COATING COMPOSITION

[75] Inventor: Masahiko Sagane, Hiratsuka, Japan

[73] Assignees: Kansai Paint Co., Ltd., Amagasaki; New Japan Chemical Co., Ltd., Kyoto, both of Japan

[22] Filed: June 20, 1973

[21] Appl. No.: 371,575

[30] Foreign Application Priority Data

June 27, 1972 Japan................................ 47-06368

[52] U.S. Cl. ................ 106/187; 106/199; 106/219; 106/236; 106/243; 260/18 R; 260/23 R; 260/32.8 R; 260/32.8 N; 260/32.8 EP; 252/316

[51] Int. Cl. ..... C08b 27/42; C08h 9/00; B01j 13/00

[58] Field of Search ........... 106/199, 187, 243, 236, 106/219; 260/32.8 R, 618 R, 611, 29.6 BE, 29.6 E, 32.8 EP, 32.8 N, 18, 23; 252/316

[56] References Cited

UNITED STATES PATENTS

| | | | |
|---|---|---|---|
| 3,280,050 | 10/1966 | Johnson | 260/23 R |
| 3,630,896 | 12/1971 | Oka | 252/316 |

*Primary Examiner*—Theodore Morris
*Attorney, Agent, or Firm*—Wigman & Cohen

[57] ABSTRACT

A semi-solid coating composition which is shapable and fluidizable under shear when applied to the surface of articles to be coated, and which comprises a fluid organic coating material and a thixotropy imparting material selected from hydrogenated castor oil and condensation products of penta- to heptahydric sugaralcohols with aromatic aldehydes, and optionally a compounding material selected from the group consisting of siliceous materials and fatty acid salts.

5 Claims, No Drawings

SEMI-SOLID COATING COMPOSITION

This invention relates to a semi-solid coating composition comprising a fluid organic coating material and a thixotropy imparting material.

In the conventionally used fluid coating materials, the fluidity thereof causes disadvantages in applying them practically. That is, tools or devices for applying the material such as brushes, roller brushes, spraying devices and the like are indispensable; re-dispersing of said coating material just before the applying is often necessary as its dispersed components such as pigments and other ingredients are liable to settle and separate during the storage period; the adjustment of consistency by adding solvents is required before the use in some instance; the surroundings are subject to become dirty by sagging of the coating material and the loss of the coating material during the applying is considerably large; and it is necessary to wash up the applying devices after the applying operation. Especially, when a small area is to be applied with the coating material, the above-mentioned disadvantages become comparatively significant, which are undesirable from a practical and economical viewpoints.

Where an article is to be simply colored on its surface, coloring materials such as crayons, chalks, lipsticks and felt pens containing liquid coloring agents may be employed without suffering the above-mentioned disadvantages. These coloring materials are serviceable for certain purposes, however, the coloring effect, surface protecting property and durability of the coloring effect are not satisfactory. Accordingly it will be apparent that they can not be used as the coating materials in a conventional meaning.

The object of the present invention is to eliminate the above-mentioned disadvantages. Further, the object of the invention is to provide a novel and improved semi-solid coating composition which can be used conveniently and readily for the coating of even a relatively small area, while the semi-solid coating composition forms a coating film having the same characteristics as those of the conventional fluid coating materials in relation to the appearance and durability.

An other object of the present invention is to provide a coating composition which can be handled like a solid and easily applied by hand of man without using any applying tool or device.

The term "semi-solid" as used hereinafter denotes a state which can shape any substance and be handled like a solid in stationary or sub-stationary conditions at room temperature but under suitable shearing force, as can be applied by hand of an average man, the semi-solid has a fluidity which is sufficient to enable it to be transferred to the surface being coated.

That is, the present invention relates to a semi-solid coating composition which is derived from a fluid organic coating material and a thixotropy imparting material. As the fluid organic coating materials, either those which contain coloring pigments or those which does not contain coloring pigments, and either those which contain volatile organic solvents as the dissolving or dispersing medium for the film forming components or those which does not contains volatile organic solvent may be employed. Further, the film forming component of which itself is a liquid may also be adoptable. For example, as the fluid organic coating materials for the semi-solid coating compositions of the present invention there are air drying coating materials and heat curable coating materials including boiled oils, ready mixed paints based on boiled oils, natural resin varnishes and enamels, cellulosic clear lacquers and lacquer enamels, alkyd resin varnishes, paints and enamels, epoxy resin varnishes and enamels, acrylic resin varnishes and enamels, melamine-formaldehyde resin varnishes and enamels, polyurethane varnishes and enamels, unsaturated polyester varnishes and enamels and the like.

The fluid organic coating materials are made semi-solid by adding a thixotropy imparting material. As the thixotropy imparting material hydrogenated castor oil and condensation products of sugaralcohols with aromatic aldehydes may be employed, and the sugaralcohol is selected from pentahydric, hexahydric and heptahydric alcohols, namely such as xylitol, sorbitol, α-glucoheptitol, and their homologues in various isomeric forms.

As the aromatic aldehydes to be condensed with the sugaralcohols there are, for example, benzaldehyde, ortho-, para- and meta-tolu-aldehyde, anisaldehyde and substituted benzaldehydes having 1 to 3 of amino groups, nitro groups or halogen atoms in their benzene nucleus. One mole of the sugaralcohols should be combined with at least 1 mole of the aromatic aldehyde as calculated from the "acetal value" in order to obtain a sufficient effect of semi-solidifying.

The characteristic "acetal value" as used hereinafter is derived from the amount of potassium hydroxide expressed in milligrams required to the neutralization of the sulfuric acid liberated by the reaction of the carbonyl compound with hydroxylamine sulfate, the carbonyl compound being formed by hydrolysis of acetal contained in one gram of the sample to be tested.

The content of the thixotropy imparting materials in the semisolid coating compositions can be determined according to the nature of the fluid organic coating materials such as the kind of the film forming components, the kinds and the contents of pigments, plasticizers and volatile solvents and the like, generally, from 0.5 to 20 percent by weight in the composition. If the content is below 0.5 percent by weight, the effect of semi-solidifying is not distinct and if exceeds 20 percent by weight, the obtained mass is too hard to be fluidized under shear by hand of man and in extreme cases the film forming property of the composition becomes deteriorated.

The applicability of the semi-solid coating composition may be further modified by replacing the thixotropy imparting materials partly with other compounding materials such as siliceous materials including floury silica and bentonite and metallic salts of fatty acids including stearate, palmitate, laurate and oleate of lithium, sodium, potassium, magnesium, calcium, zinc and aluminum in an amount not exceeding 19.5 percent by weight of the composition. The improvement in the elimination of the brittleness and the smoothness on applying the semi-solid coating composition is attained by such replacement.

However, if more than 19.5 percent by weight of the thixotropy imparting material is replaced by such additives, namely when the content of the thixotropy imparting material is lower below 0.5 percent by weight, the solidifying of the composition becomes insufficient.

The above mentioned compounding materials alone may impart thixotropy slightly to the conventional organic fluid coating materials so that the sagging effect in the upright state of the coated film is lowered, however, they can scarcely act as the solidifying reagents against the fluid coating materials without the aid of the thixotropy imparting materials of the present invention.

In the present invention, the penetration value and viscosity at 25°C are employed as the measure for defining the lower and upper limits, respectively, of the solidity of the semi-solid coating composition. It is desirable in the present invention that the value of penetration at 25°C does not exceed 2,000, preferably 1,200. The penetration value is measured according to ASTM D-1321, in which the pointed end of a brass made circular cone having an apex angle of 60°, a height of 45 mm and a weight of 50 gr is contacted downward to the horizontal surface of the shaped material to be tested, and the circular cone loaded with a weight of 150 gr. is freely lowered down from the surface for 5 seconds only by gravity. Then then the depth of lowering of the circular cone is measured. The value of the penetration value is represented such that, for example, the value of 2,000 in penetration means that the depth of lowering is 20 mm. In cases where the penetration value is more than 2,000 (25°C), the semi-solid coating composition has no sufficient solidity to receive the shaping by cutting or molding or to be handled as a solid, and even if it can be shaped, it will be deformed easily by the pressure caused in the applying operation, therefore such are not preferable. In the measurement of the upper limit of the solidity, the use of an extrusion type plastometer is preferable because the above-mentioned penetration method using the circular cone often leads to erroneous results, and the upper limit of solidity at 25°C is not more than $10^5$ centipoises, preferably not more than $4 \times 10^4$ centipoises.

In preparing the semi-solid coating composition containing the thixotropy imparting material, to a fluid coating material is added a certain amount of the thixotropy imparting material, and the latter is then finely dispersed or dissolved by a dispersion apparatus such as a roller mill, colloid mill or propeller type stirrer, thereafter it is allowed to stand still to form a semi-solid coating composition. Otherwise, the thixotropy imparting material is firstly dissolved or dispersed into a volatile solvent which is miscible with the fluid coating material, and then thus obtained solution or dispersion is added to the fluid coating material and mixed well. In either case, the working time of the operation can be reduced by heating as far as it causes no hazard such as unfavourable reaction or fear of fire.

To the fluid organic coating material which is added the above-mentioned thixotropy imparting material and, if desired, the compounding materials, is cooled and stood still to form a semi-solid body, which can be used in a block form or cut pieces, meanwhile, the composition may be filled before cooling in a small cavity of a sliding holders for applying and then changed into semi-solid in the cavity in course of time.

It has been well known in the ordinary art that the conventional liquid coating materials may be improved by adding a small amount of thixotropy imparting material in relation to the applicability. However, the object of the present invention is quite different from the above, that is, in the present invention, the thixotropy of the fluid coating material is greatly fortified by adding a certain amount of the thixotropy imparting material such as benzylidene sorbitol homologues, thereby the product can be shaped in any form and size according to the requirement of the use. Further, though the product appears to be a solid in a stationary condition, it easily recovers the fluidity by shear in contacting with a surface of a shaped article to be coated through its thixotropic character, and the fluidized coating material is transferred to the surface. Of course, it is also known that certain kinds of liquid may be solidified by the addition of small amount of thixotropy imparting materials, however, the substantial purpose of the solidifying in such cases is merely to obtain a solid. Contrary to the above, the semi-solid in the meaning of the present invention is shapable by cutting or molding and nevertheless able to be easily fluidized by shear to the extent that can be transfered to a surface of an article. That is not to be anticipated from the above conventional technique.

The semi-solid coating composition of the present invention can be applied with almost the same easiness as compared with the brushing, roller brushing and the like for the conventional fluid coating materials, and no tool or device is required for the application. Therefore, it is not only especially advantageous when a small area is to be coated but also advantageous when a large area, a coil etc. is to be coated. In addition to the above feature of the invention, the semi-solid coating composition forms a continuous coating film having the same protective and/or decorative effects as those of the conventional fluid.

In order that those skilled in the art may better understand the present invention and the manner in which it may be practised, the following specific examples are given.

EXAMPLES 1 to 6

To a white pyroxyline lacquer enamel (trade name: "Celva No. 531 White" made by Kansai Paint Company, Limited, Japan; non-volatile matter: 40 percent by weight) was added several amounts of benzylidene sorbitol as the thixotropy imparting material which was prepared through the process described afterwards. Thereby, six kinds of semi-solid coating compositions containing from 2.8 to 13.2 percent by weight of benzylidene sorbitol was prepared. The values of penetrations and viscosities at 25°C (same in every Example followed) of the semi-solid coating compositions are shown in the following Table 1. The methods for measuring the characteristics were the same as those disclosed in the foregoing explanation, and so with the following examples.

In the admixing operation, 150 gr of the lacquer enamel was previously heated to 80°C, while benzylidene sorbitol in an amount depending on each Example was mixed with N, N-dimethylformamide of twice amount by weight and heated to 80°C to dissolve, then the both materials were well mixed together and allowed to stand still to cool to the room temperature.

Each of thus obtained semi-solid lacquer enamel was shaped into a stick by cutting and it can be smoothly applied on the surface of a mild steel plate by hand.

Table 1

| Example Number | Amount of Thixotropy Imparting Material (% by weight) | Penetration value | Viscosity (centipoise) |
|---|---|---|---|
| 1 | 2.8 | 1,130 | $1.2 \times 10^3$ |
| 2 | 3.6 | 670 | $2.3 \times 10^3$ |

Table 1-Continued

| Example Number | Amount of Thixotropy Imparting Material (% by weight) | Penetration value | Viscosity (centipoise) |
|---|---|---|---|
| 3 | 4.5 | 460 | $7.9 \times 10^3$ |
| 4 | 6.8 | 300 | $1.9 \times 10^4$ |
| 5 | 9.4 | 270 | $2.7 \times 10^4$ |
| 6 | 13.2 | 250 | $3.0 \times 10^4$ |

Preparation of the benzylidene sorbitol 0.3 ml of 96 percent sulfuric acid was added dropwise into a mixture of 40.0 gr of 70 percent sorbitol, 29.4 g of benzaldehyde and 520 ml of cyclohexane, and then the mixture was heated to allow to condensate while eliminating the produced water by azeotropic distillation. After about 7 hours continuation of the reaction, the reaction mixture was cooled to room temperature and then neutralized. The precipitate was settled and washed with water by decantation, filtered, rinsed several times with hot water and finally dried to obtain the reaction product as white powder.

The acetal value of the product was 296.4 which corresponds to a combination ratio of 1.8 moles of benzaldehyde per 1 mole of sorbitol.

EXAMPLES 7 to 10

As shown in the following Table 2, four kinds of fluid coating materials, that is, polyurethane varnish (trade name: "Olester-M71-50A" made by Mitsui-Toatsu Chemicals, Inc., Japan; non-volatile matter: 50 percent by weight), yellow alkyd resin enamel (trade name: "Phthalit No. 1-540 Medium Yellow" made by Kansai Paint Company, Limited, Japan: non-volatile matter: 64 percent by weight), synthetic resin (alkyd resin) anticorrosive paint (trade name: "Kanpe Home Use Paint: Quick Drying Anticorrosive Paint, rusty red" made by Kansai Paint Company, Limited Japan: non-volatile matter: 80 percent by weight) and black synthetic resin (alkyd resin) paint (trade name: "SD Ready Mixed Paint, black" made by Kansai Paint Company, Limited; non-volatile matter: 74 percent by weight) were used. Benzylidene sorbitol was added in like manner as in foregoing Example 1 to the above fluid coating materials, and four semi-solid coating compositions corresponding to each as shown in the following Table 2 were obtained. The results of measurements for the penetration and viscosity of them are shown in the Table 2.

These semi-solid coating compositions could be easily applied to the surfaces of smoothly planed wooden boards and mild steel plates.

bitol uniformly, and thereafter allowed to cool to room temperature to solidify. Thus a transparent semi-solid mass was obtained. The penetration and the viscosity of the semi-solid boiled oil thus obtained were 1,060 and $1.3 \times 10^3$ centipoises at 25°C respectively.

By applying the semi-solid boiled drying oil a smooth, clear and hard coating film was formed on the surface of miled steel plate and wooden board without difficulty.

Preparation of the methyl benzylidene sorbitol

The methyl benzylidene sorbitol was prepared in like manner as the benzylidene sorbitol in Examples 1 to 6, in which 32.0 gr of 70 percent sorbitol, 44.3 gr of para-tolualdehyde and 580 ml of cyclohexane were used. The acetal value of the reaction product in white powder form was about 345 which correspond to the combination ratio of 3.0 moles of para-tolualdehyde per 1 mole of sorbitol.

EXAMPLE 12

10 gr of the thixotropy imparting material "Thixatrol ST" (trade name, made by The Baker Castor Oil Company, Limited U.S.A.) composed of principally hydrogenated castor oil was added to 140 gr of white lacquer enamel as used in the foregoing Example 1, and the mixture was stirred at room temperature with a stirring propeller of high speed type for 5 minutes to homogenize. Then the dispersion was allowed to stand still to form a semi-solid lacquer enamel, where the penetration valve and the viscosity at 25°C were 810 and $1.6 \times 10^3$ centipoises respectively.

EXAMPLE 13

The procedure of Example 12 was repeated using 17 gr of "Thixatrol ST" and 133 gr of the white lacquer enamel. The penetration and the viscosity at 25°C were 630 and $3.2 \times 10^3$ centipoises respectively.

EXAMPLE 14

Each 9 gr of organic modified bentonite (trade name: "Orben No. 2" made by Shiraishi Calcium Industries Company, Limited, Japan), "Thixatrol ST" and benzylidene sorbitol (as used in Example 1) were added to 123 gr of the white lacquer enamel as used in Example 1, and they were dispersed through the same method as the above Example 12. The penetration value and the viscosity at 25°C of the obtained semi-solid lacquer enamel were 1140 and $1.2 \times 10^3$ centipoises.

Table 2

| Example Number | Coating Material | Amount of Thixotropy Imparting Material (% by weight) | Penetration Value | Viscosity (centipoise) |
|---|---|---|---|---|
| 7 | Polyurethane varnish | 4.0 | 440 | $3.8 \times 10^4$ |
| 8 | Yellow alkyd resin enamel | 2.6 | 860 | $1.5 \times 10^3$ |
| 9 | Synthetic resin anticorrosive paint | 0.9 | 1,150 | $0.8 \times 10^3$ |
| 10 | Black synthetic resin paint | 1.6 | 840 | $1.7 \times 10^3$ |

EXAMPLE 11

2.4 parts by weight of methyl benzylidene sorbitol which was prepared by the procedure shown afterwards was added to 97.6 parts by weight of boiled oil (trade name: Boiled Oil "S" No.1, made by Nisshin Oil Mills, Ltd., Japan) and mixed. The mixture was then heated to 210°C to dissolve the methyl benzylidene sor-

EXAMPLE 15

11.4 gr of "Thixatrol ST" was added to 138.6 gr of a clear lacquer (trade name: "Celva No. 63", clear lacquer for wood, made by Kansai Paint Company, Limited, Japan; non volatile matter: 33 percent by weight), and was dispersed through the same procedure as the above Example 12. The penetration and the viscosity at 25°C of the obtained semi-solid clear lacquer were 930 and 1.5×10³ centipoises.

EXAMPLE 16

A semi-solid white lacquer enamel of high solid type was prepared by adding benzylidene sorbitol (as used in Example 1) as the thioxotropy imparting material to a white high solid pyroxyline lacquer enamel (trade name: Neo-Phthalit No. 531, White" made by Kansai Paint Company, Limited Japan).

The preparation process was such that, in the first place, 17 gr of benzylidene sorbitol and 173 gr of ethylene-glycol monoethyl ether (trade name: "Ethyl Cellosolve") were heated together in a flask and refluxed at boiling temperature for a short time to obtain a hot solution. The hot solution was added into 310 gr of the above-mentioned lacquer enamel (non-volatile matter: 62 percent by weight) which being previously heated to 120°C, and the mixture was stirred well, then it was allowed to cool.

The penetration value and the viscosity of thus obtained semi-solid lacquer enamel were 400 and 3.1×10³ centipoises, respectively, and it can be cut into any desired shape, further, smooth coating films can be formed on the surfaces of metal and wood by applying it by hand.

EXAMPLE 17

150.0 gr of white pyroxyline lacquer enamel ("Celva No. 531 White, as used in Examples 1 to 6) was heated to 80°C and to the enamel was added 6.0 gr of aluminum stearate. After the the aluminum stearate dispersed completely, a hot solution of 4.0 gr of benzylidene sorbitol (same as used in Examples 1 to 6) in 8.0 gr of N,N-dimethyl formamide was poured into the above lacquer enamel and mixed well. Standing still to cool to room temperature, a semi-solid, white lacquer enamel having a penetration value of 450 and viscosity of 1.1×10⁴ centipoises was obtained. The semi-solid coating composition thus obtained could be easily applied by hand on the smooth surface of a miled steel panel or wooden board.

EXAMPLE 18

50 gr of benzylidene xylitol prepared through the process described afterward was dissolved in 80 g of N,N-dimethylformamide by heating to 130°C, and the solution thus formed was then poured into 150 g of a black pyroxyline lacquer enamel (trade name "Celva No. 582 Tinting Black", made by Kansai Paint Company Limited, Japan; non-volatile matter : 32 percent by weight) which was heated to 80°C previously, and mixed well.

Allowing to stand still to cool to the room temperature, a semi-solid black lacquer enamel having a penetration value of 280 and a viscosity of 2.9×10⁴ centipoises was obtained.

Thus obtained semi-solid lacquer enamel could be easily cut into any desired shape and could be applied smoothly by hand on any wooden board.

Preparation of the benzylidene xylitol

The process for the preparation of the benzylidene sorbitol described in Examples 1 to 6 was repeated using 27.2 g of xylitol instead of sorbitol, 38.0 g of benzaldehyde and 550 ml of cyclohexane. Thus benzylidene xylitol was obtained as white powder.

The acetal value of the product was 336 which corresponds to a combination ratio of 2.0 moles of benzaldehyde per 1 mole of xylitol.

EXAMPLE 19

7 gr of benzylidene $\alpha$-glucoheptitol prepared through the process described afterward was dissolved in 13 g of N,N-dimethylformamide by heating to 130°C, and the solution thus formed was poured into 150 g of a scarlet alkyd resin enamel (trade name "Phthalit No. 1-586 Scarlet, Medium", made by Kansai Paint Company Limited, Japan; non-volatile matter: 75 percent by weight) which was heated to 80°C previously, and mixed well.

Allowing to stand still to cool to the room temperature, a semi-solid scarlet alkyd resin enamel having a penetration value of 790 and a viscosity of 1.6×10³ centipoises was obtained.

Thus obtained semi-solid alkyd resin enamel could be easily cut into any desired shape and could be applied smoothly by hand on any wooden board.

Preparation of the benzylidene $\alpha$-glucoheptitol

The process for the preparation of the benzylidene sorbitol described in Examples 1 to 6 was again repeated using 38.0 g of $\alpha$-glucoheptitol instead of sorbitol, 38.0 g of benzaldehyde and 550 ml of cyclohexane. Thus benzylidene-glucoheptitol was obtained as white powder.

The acetal value of the product was 288 which corresponds to combination ratio of 2.0 moles of benzaldehyde per 1 mole of $\alpha$-glucoheptitol.

According to the above examples, it will be understood that the shapable semi-solid coating composition of the present invention can be advantageously put to the practical uses without any troublesome coating operation. It should be emphasized, however, that the specific examples as shown herein are intended as merely illustrative and in no way restrictive of the invention.

What is claimed is:

1. In a coating composition which includes an organic fluid, film-forming material such as boiled oils; ready mixed paints based on boiled oils; natural resin varnishes and enamels; cellulosic clear lacquers and lacquer enamels; alkyd resin varnishes, paints and enamels; epoxy resin varnishes and enamels; acrylic resin varnishes and enamels; melamine-formaldehyde resin varnishes and enamels; polyurethane varnishes and enamels; and unsaturated polyester varnishes and enamels; the improvement comprising:

a thixotropy imparting material which is at least one member selected from the group consisting of hydrogenated castor oil and condensation products of a sugaralcohol with an aromatic aldehyde, said sugaralcohol being a member selected from the group consisting of pentahydric, hexahydric and heptahydric alcohols, said aromatic aldehyde being a member selected from the group consisting of benzaldehyde, ortho-, para- and meta-tolualdehyde, anisaldehyde and substituted benzaldehydes having 1 to 3 of amino groups, nitro groups or halogen atoms in their benzene nucleus; said thixotropy imparting material being present in an amount ranging from 0.5 to 20 percent by weight;

said coating composition is a semi-solid, shapable mass which is fluidizable under shear and has a penetration value of not more than 2,000 and a viscosity of not more than $10^5$ centipoises, at 25°C, respectively.

2. The coating composition as defined in claim 1 wherein said penetration value is preferably 1,200 or below and the viscosity is preferably $4\times10^4$ centipoises or below.

3. The coating composition as defined in claim 1 wherein said thixotropy imparting material is partly replaced by compounding material selected from siliceous materials and fatty acid soaps in an amount not exceeding 19.5 percent by weight of said composition.

4. The coating composition as defined in claim 3 wherein said siliceous material is selected from a group consisting of floury silica and bentonite.

5. The coating composition as defined in claim 3 wherein said fatty acid soap is selected from a group consisting of stearate, palmitate, laurate and oleate of lithium, sodium, potassium, magnesium, calcium, zinc and aluminum.

* * * * *

UNITED STATES PATENT OFFICE
CERTIFICATE OF CORRECTION

PATENT NO. : 3,892,585
DATED : July 1, 1975
INVENTOR(S) : MASAHIKO SAGANE

It is certified that error appears in the above-identified patent and that said Letters Patent are hereby corrected as shown below:

The Japanese Priority Application Number should be --63684/1972-- rather than "06368/1972" as it appears in the Letters Patent.

Signed and Sealed this twenty-fifth Day of November 1975

[SEAL]

Attest:

RUTH C. MASON
Attesting Officer

C. MARSHALL DANN
Commissioner of Patents and Trademarks